(12) United States Patent
Schäflein et al.

(10) Patent No.: US 8,183,728 B2
(45) Date of Patent: May 22, 2012

(54) STATOR FOR AN ELECTRIC MACHINE

(75) Inventors: Alexander Schäflein, Schweinfurt (DE);
Matthias Weidner, Wasserlosen-Burghausen (DE); Ralf Ronnebeck, Schonungen-Forst (DE); Marcus van Heyden, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/491,405

(22) Filed: Jun. 25, 2009

(65) Prior Publication Data

US 2010/0156208 A1 Jun. 24, 2010

(30) Foreign Application Priority Data

Jun. 26, 2008 (EP) ...................................... 08159055

(51) Int. Cl.
*H02K 11/04* (2006.01)
(52) U.S. Cl. ........................................................ 310/71
(58) Field of Classification Search .................... 310/71, 310/180, 194; 336/192; 439/675
See application file for complete search history.

(56) References Cited

U.S. PATENT DOCUMENTS

| | | | | |
|---|---|---|---|---|
| 4,114,056 A * | 9/1978 | Nimura | ............................ | 310/71 |
| 5,001,379 A * | 3/1991 | Katayama | ..................... | 310/194 |
| 5,828,147 A * | 10/1998 | Best et al. | ......................... | 310/71 |
| 6,194,806 B1 * | 2/2001 | Suzuki et al. | .................. | 310/269 |
| 6,369,473 B1 * | 4/2002 | Baumeister et al. | ............ | 310/71 |
| 7,557,478 B2 * | 7/2009 | Hoshika | ......................... | 310/71 |
| 7,579,729 B2 * | 8/2009 | Takashima et al. | ............. | 310/71 |
| 7,723,878 B2 * | 5/2010 | Yagai et al. | ..................... | 310/71 |
| 7,737,587 B2 * | 6/2010 | Kataoka et al. | ................. | 310/71 |
| 2002/0067094 A1 * | 6/2002 | Okazaki et al. | ............... | 310/180 |
| 2003/0201688 A1 * | 10/2003 | Yamamura et al. | ........... | 310/216 |
| 2004/0135457 A1 | 7/2004 | Holzheu | | |
| 2007/0262664 A1 | 11/2007 | Niehaus | | |
| 2008/0265701 A1 * | 10/2008 | Ueda et al. | ...................... | 310/71 |
| 2009/0102312 A1 | 4/2009 | Tsukashima | | |

FOREIGN PATENT DOCUMENTS

JP 06233483 8/1994

* cited by examiner

*Primary Examiner* — Tran Nguyen
(74) *Attorney, Agent, or Firm* — Cozen O'Connor

(57) ABSTRACT

A stator for an electric machine includes an annular stator yoke at which a plurality of radially projecting stator teeth carrying coils with coil terminals is circumferentially arranged. Annular connection conductors are arranged concentrically at a carrier member adjacent to the coils so as to be electrically insulated relative to one another and are connected to the coil terminals in a predetermined manner in the connection area of the carrier member. The coil terminals emerge axially from the coils and apertures corresponding to the coil terminals are formed in a wall area of the carrier member. The coil terminals extend axially through these apertures into the connection area of the carrier member, wherein the wall area of the carrier member radially overlaps an exit area where the coil terminals emerge from the coils.

20 Claims, 6 Drawing Sheets

STATOR FOR AN ELECTRIC MACHINE

BACKGROUND OF THE INVENTION

1. Field of the Invention

The invention is directed to a stator for an electric machine having an annular stator yoke at which a plurality of radially projecting stator teeth is arranged in circumferential direction, coils with coil terminals being arranged at these stator teeth. Annular connection conductors are provided at the stator for connecting to the coil terminals. These annular connection conductors are arranged so as to be concentric to one another and electrically insulated relative to one another in a connection area of a carrier member, this connection area being located next to the coils, and are connected therein to the coil terminals in a predetermined manner.

2. Description of the Related Art

A stator of the type mentioned above is described in US2007/0262664. The coils are made from a wire wound around two insulating bodies arranged at the front of the stator. The ends of the coils are bent out of the winding plane in radial direction and are inserted into wire guide portions at an insulating body which penetrate into the receiving space of a supporting structure accommodating the connection conductors. The ends of the coils are bent once again in this receiving space, specifically in circumferential direction of the stator, for connecting to the connection conductors. When mounting the stator of the electric machine, which is constructed in this case as an external rotor, the stator coils are initially fitted to the stator teeth radially from the outer side and, in another step, the supporting structure with the connection conductors is pushed on from the front side of the stator facing the connection side until coming into contact with the wire guide portions. The ends of the coils can then be connected to the connection conductors by means of separate terminal elements.

The connection arrangement mentioned above is advantageous in an external rotor motor, but can only be used conditionally with an internal rotor. Irrespective of the wiring variants, the handling of the ends of the coils and particularly the bending points is critical because the sensitive lacquer coating at the latter can tear and be penetrated by moisture which can subsequently lead to corrosion and to the failure of winding components.

SUMMARY OF THE INVENTION

It is an object of the present invention to improve a stator of the type mentioned above so that its connection arrangement in particular is designed so as to be more process-capable, impervious to manufacturing tolerances and assembly tolerances and equally suitable for an internal rotor motor or an external rotor motor.

According to the invention, the coil terminals emerge from the coils axially with reference to the stator and apertures which correspond to the coil terminals are formed in a wall area of the carrier member, the coil terminals being introduced axially through these apertures into the connection area of the carrier member, and the wall area of the carrier member radially overlaps the exit area where the coil terminals emerge from the coils.

When the coils are wound, a winding plane is defined by the wound winding conductor, e.g., a winding wire. The proposed solution offers the advantage that the coil terminals which extend in a winding plane after winding can remain axially oriented within this winding plane and are available for connecting to the connection conductors. For this purpose, the supporting member accommodating the connection conductors is introduced axially at the connection side of the stator, and the coil terminals can be guided into the connection area through apertures which are provided in the wall area. When contact is made, the wall area of the carrier member overlaps the exit area where the coil terminals emerge from the coils. This allows the coil terminals to pass into the connection area without being bent out of their winding plane for this purpose.

The coils with at least one insulating body are advantageously arranged at the teeth, the coil terminals being arranged in the insulating body. An insulating or winding body of this kind insulates the coil conductor relative to the stator yoke and at the same time defines a winding area so that the coil can be constructed compactly and so as to be dimensionally stable over the long term.

In a particularly advantageous manner, the carrier member can be supported at the stator at a plurality of insulating bodies, these insulating bodies forming at least one common axial and/or radial contact surface.

The coil terminals provided for connecting to the connection conductors can be formed directly by the winding ends of the coils. Alternatively, the winding ends can also be secured to the insulating or winding bodies with strain relief and connected at that location to contact portions of contact elements which are likewise fixed to the winding bodies and which, in this case, form the coil terminals. In so doing, the winding ends also remain axially oriented in the winding plane and free from forces when the coils and connection arrangement are mounted on the stator.

According to a preferred embodiment form, the contact portions with the winding ends connected therein are likewise introduced axially into the connection area of the carrier member through the windows or apertures of the carrier member.

According to another embodiment of the invention, it is extremely advantageous in technical respects relating to manufacture when the carrier member is constructed as a plastic profile which is open on one side and which has a base with adjoining side walls which outwardly define the connection area. A plurality of separating webs are provided within the carrier member for a mutually insulated arrangement of the connection conductors and are preferably integral with the base body of the carrier member. It is useful for further purposes of connection when the separating webs rise above the connection conductors so that there is electrical contact between a coil terminal only at the locations provided for that purpose and, otherwise, insulating gaps are generated between the voltage-carrying conductors. The side walls are shaped in such a way that they rise above the separating webs. Accordingly, a trough-shaped receiving space forming a connection area can be tightly closed or sealed with a sealant, e.g., with a cover element or with a resin, silicone, or other filler, wherein the connection conductors, the winding ends, the coil terminals and mutual contact areas thereof, and the windows of the carrier member are closed so as to be sealed.

To bridge the insulating gaps and to generate a contact area between the coil terminals and the connection conductors, the connection conductors have terminal areas at predetermined positions which project from the latter toward the open side of the connection area. These terminal areas can be formed at the connection conductors in a simple manner as swaged or stamped parts. A ribbon-shaped or wire-shaped material with a low electrical resistance, preferably copper, which is bent in a ring shape for arranging in the connection area is particularly suitable as a connection conductor. The ring-shaped connection conductors can be closed in circumferential direction or preferably open so that they are free to move in case of thermally induced changes in length.

The connection conductors can be arranged at the stator so as to be staggered axially. In this case, the carrier member contacts the stator by a side wall and is supported at the stator, and the coil terminals projecting through the apertures into the connection area can be directly connected.

According to an alternative variant, the connection conductors can also be arranged at the stator so as to be staggered radially. The carrier member can contact the stator by a base area located opposite to the open side and can be supported at the stator. The coil terminals projecting axially through the apertures into the connection area are bent radially by 90° inside the connection area so that they intersect with the connection conductors and can be connected by means of the terminal areas projecting from the latter.

To connect the stator to a power supply arrangement, the connection conductors are connected to terminal conductors which are likewise arranged in an insertion portion formed at the carrier member and can also be sealed with a sealant in this insertion portion.

The invention will be described by way of example in the following by means of the accompanying drawings.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
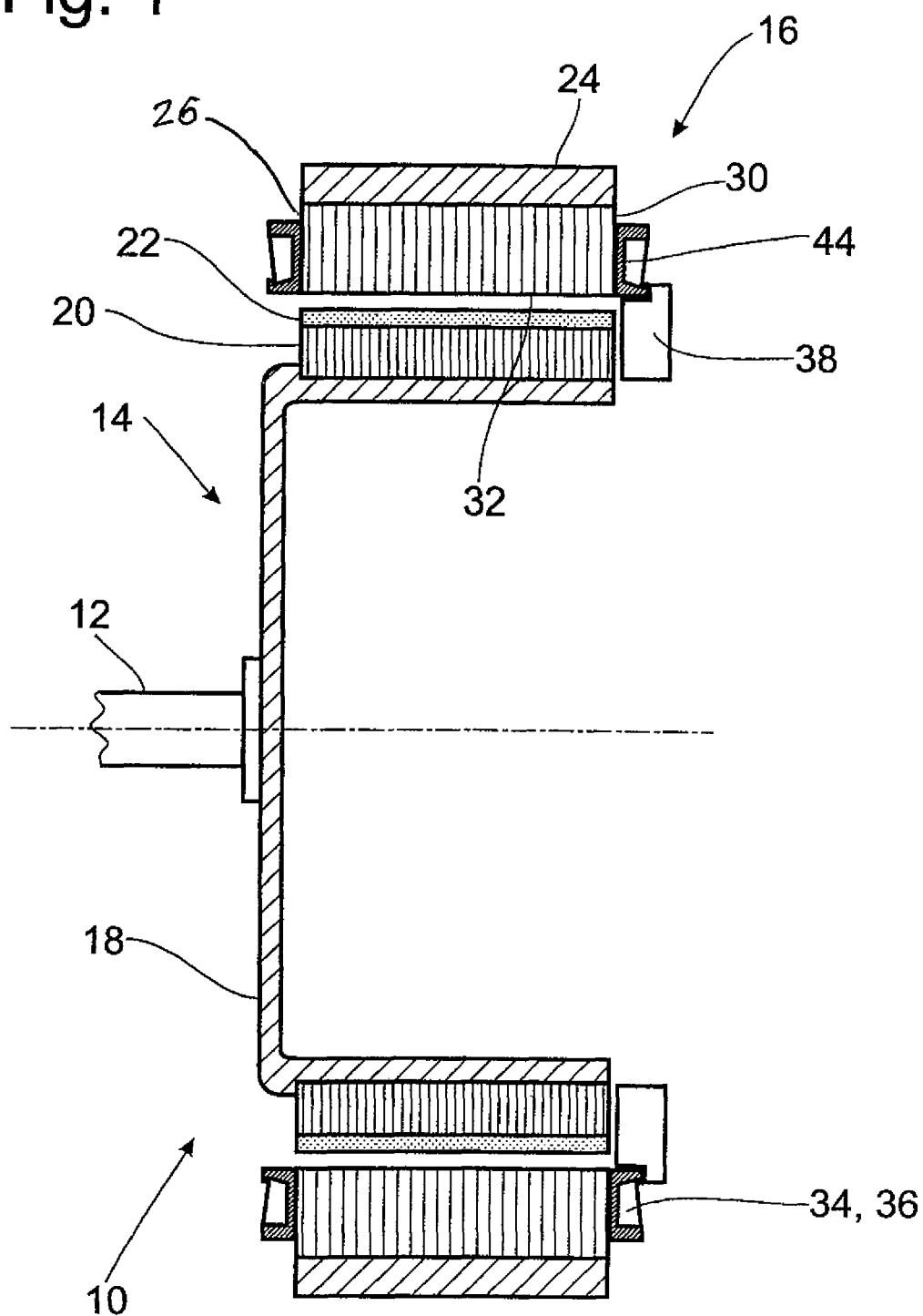
FIG. 1 shows a schematic view of an electric machine in an internal rotor type construction.

FIG. 1 is a schematic view of an electric machine 10, more precisely a permanently excited electric synchronous machine in an internal rotor type construction, with a rotor 14 which is rotatable around a rotor shaft 12 and with a stator 16 which surrounds the rotor 14 radially outwardly. The rotor 14 includes a cup-shaped rotor carrier 18 which is shaped from a steel plate, a laminated rotor core 20 arranged on the cylindrical outer circumferential surface of the rotor carrier 18, and a plurality of permanent magnets 22 at a distance from one another arranged on the rotor core 20.

The stator 16 includes an annular stator carrier 24 made of metal, for example, an aluminum or steel material, a circular laminated stator core 26 which is also formed of stacked plates being arranged in its recess. The stator carrier 24 can be an outer housing or an intermediate housing of the electric machine 10. The laminated stator core 26 is constructed in a segmented manner and includes a plurality of identical, T-shaped stator segments 28 (FIG. 2) which are received and held together by the stator carrier 24.

Each of the stator segments 28 has a yoke area 30 and a tooth 32 which is directed radially inward at the stator 16 and which is outfitted with an individual coil 36 to form the winding 34. As will be explained more fully in the course of the description, the ends of the individual coils 36 are wired in circuit by means of a connection arrangement 38 shown only schematically in FIG. 1 and are connected to power electronics, not shown in the drawing, by which current of variable phase and amplitude can be applied to the winding 34 for operating the electric machine 10.

Figure 2:
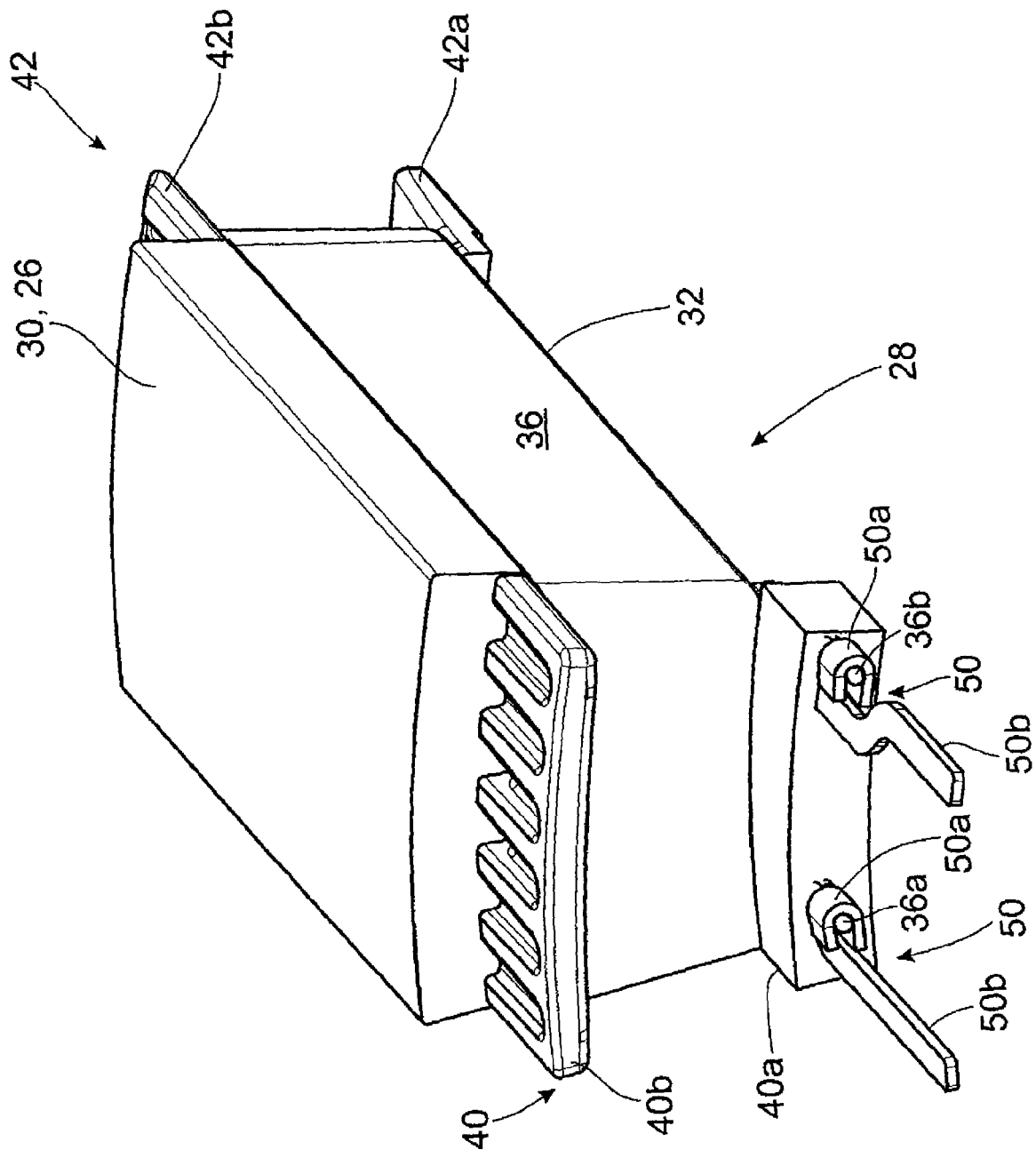
FIG. 2 shows a T-shaped stator segment of the electric machine shown in FIG. 1 which is outfitted with an individual coil.

Before mounting the stator 16, the individual coils 36 of copper wire are wound around the teeth 32 by means of two insulating or winding bodies 40, 42, respectively, made from a heat-resistant plastic and are prevented from slipping off by means of a tooth head, not shown in FIGS. 1 and 2, which is formed on the radial inner side. Each winding body 40, 42 has a base area 44 (FIG. 1) abutting the front side of the laminated core 26 and two legs 40a, b; 42a, b which project from the base area 44 approximately at right angles and which define the winding area in radial direction. The insulating bodies 40, 42 can also cover the longitudinal sides of the teeth 32 at the same time and, further, can be constructed in one piece, i.e., jointly, at least one parting line or joint being provided for mounting on the teeth 32. A mutual overlapping of the partial areas in the area of the joint is advantageous in order to compensate for tolerances.

As an alternative to the prefabricated insulating bodies 40, 42, the teeth 32 can also be overmolded with a plastic at the longitudinal and front sides to form the insulating bodies so that the entire circumferential surface of a tooth 32 defining the winding area is insulated.

Two contact elements 50 are fixed to the radial inner legs 40a of the insulating bodies 40 at a front side of the stator 16 and are inserted at that location or—when the insulating bodies 40 are injection molded—are partially overmolded as an insert part. Every contact element 50 exiting axially from the insulating body 40 with respect to the stator 16 has a contact portion 50a which is bent in a U-shape and a strip-shaped contact portion 50b in the form of a pin. A winding end 36a, b coming from the winding area and guided in a groove inside the leg 40a is inserted into the U-shaped contact portion 50a, connected therein preferably by a material bond, e.g., by soldering or welding, and is accordingly secured with strain relief. The above-mentioned groove is not visible in FIG. 2 because it is covered by the winding. It can be seen that the pins 50b initially project axially completely with their entire length with respect to the stator, which is required for connecting subsequently. The pin 50b shown on the right-hand side in FIG. 2 is offset within its extension; this is carried out merely for reasons of space for arranging at the stator.

Figure 3:
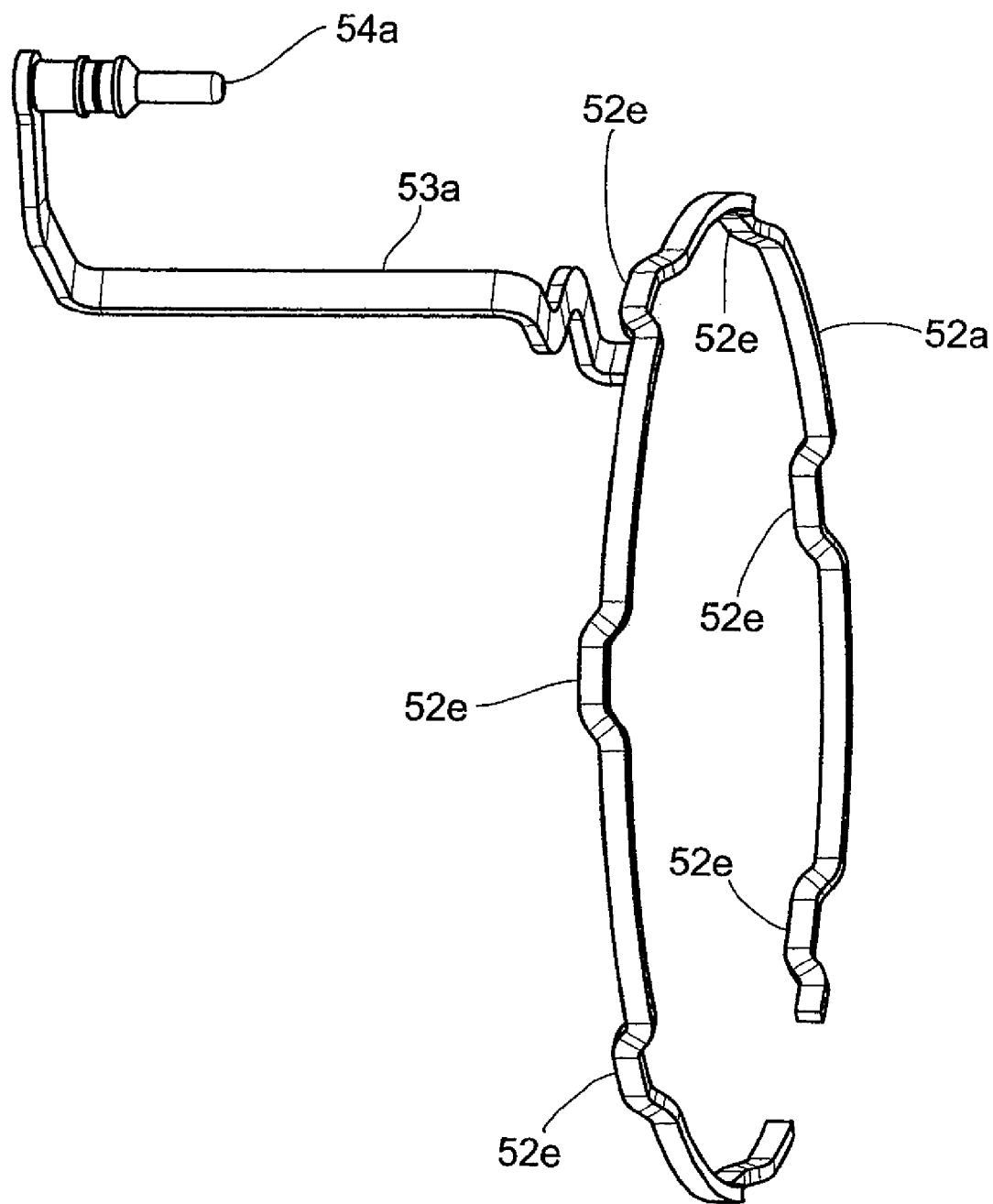
FIG. 3 shows a ring-shaped connection conductor with a terminal conductor arranged thereon.

Electrically separate strands are associated with the coils 36 and, as will be further described in the following, are wired together in a predetermined manner by means of the connection arrangement 38 by common connection conductors 52a-c, only one of which, 52a, is shown by way of example in FIG. 3. The connection conductors 52a-c are constructed as copper strip conductors and are bent to form a preferably open ring. A strip-shaped terminal conductor 53a-c which is likewise made of copper and whose free end has an eyelet in which a contact pin 54a-c is soldered or welded for connecting a power cable is connected to each of the connection conductors 52a-c. In order to connect to the coil terminals 50b, the connection conductors 52a-c have terminal areas 52 which are raised relative to their base body and which are produced in the present example by a deformation process.

In the present embodiment example, the coils 36 are connected in a delta connection. However, the type of connection is not relevant for the following description, i.e., a star connection or other connection could also be implemented alternatively using another, fourth connection conductor.

Figure 4:
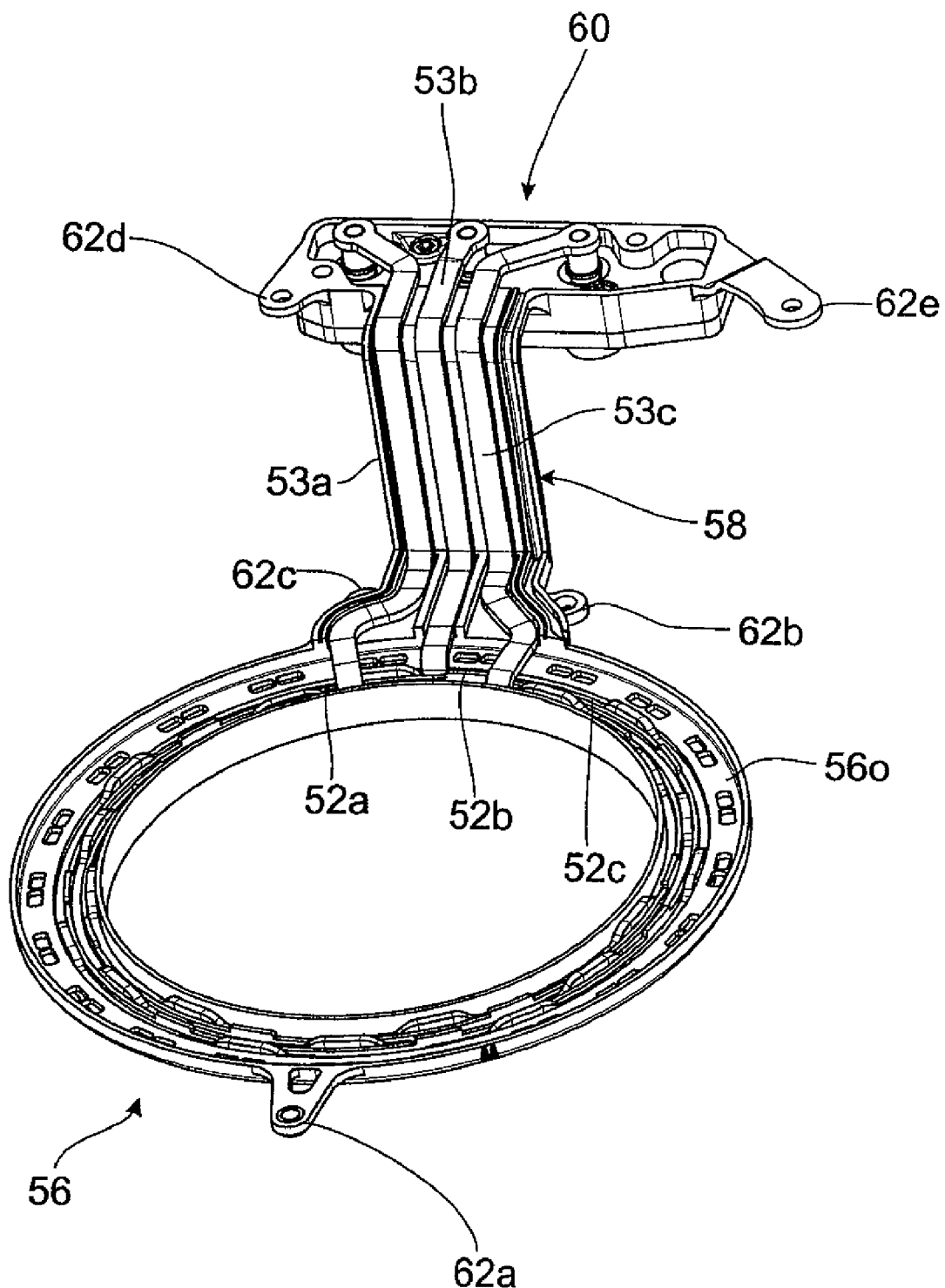
FIG. 4 shows a preassembled constructional unit comprising a carrier member, an insertion portion and a terminal housing part with conductors arranged therein.

For their arrangement at the stator 16, the connection conductors 52*a-c* are received by an annular carrier member 56 made of plastic as is shown in FIG. 4. The carrier member 56 is supported axially in FIG. 1 at the insulating bodies 40 of the coils 36 and, at the same time, is also radially centered by the inner circumferential surface defined by the coils 36. Further, an insertion portion 58 which is directed radially outward is formed or arranged at the carrier member 56 for receiving the three terminal conductors 53*a-c* so as to be insulated from one another. At its free end, the insertion portion 58 has a terminal housing part 60 for receiving the contact pins 54*a-c* and for the connection thereof. For securing to the stator carrier 24, the structural unit which is formed of the elements 56, 58, 60 and which is preferably produced as an injection molded part includes a plurality of fastening portions 62*a-e* which are screwed to the stator carrier 24 by threaded bolts. Alternatively or in addition, a catch device can be arranged at this location.

Figure 5:
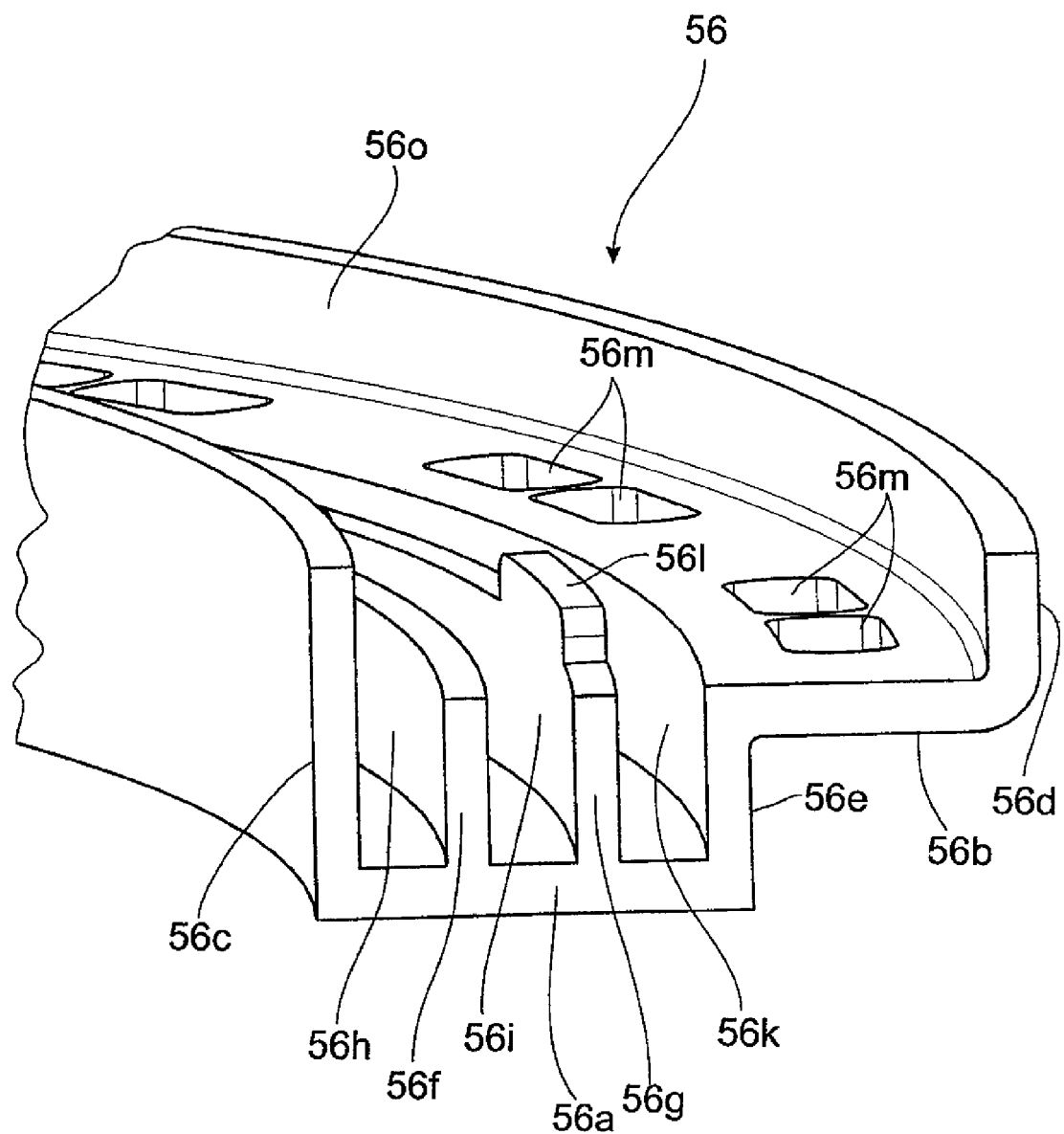
FIG. 5 shows a section of the carrier member in a perspective sectional view.

FIG. 5 is a sectional perspective view of a section of the supporting structure 56 which is open at one side and which has a stepped base 56*a, b* and side walls 56*c, d, e* projecting perpendicularly therefrom and is divided into a plurality of annular chambers 56*h-k* by separating webs 56*f, g* for insulated arrangement of the connection conductors 52*a-c*. The side walls 56*c, d* rise above the separating webs 56*f, g* and the wall area 56*e* so that an open annular space adjoining the annular chambers 56*h-k* is formed in which the connection conductors 52*a-c* are electrically connected to the coil terminals 50*b*. Further, in order to prevent short-circuiting relative to the connection conductors 52*a-c*, the separating webs 56*f, g* are provided with elevations 56*l* at the positions where the coil terminals 50*b* emerge, these elevations 56*l* serving as a support for the coil terminals 50*b* as can be seen from FIG. 6. A number of windows 56*m* corresponding to the coil terminals 50*b* is formed in the base area 56*b*. The coil terminals 50*b* which are initially axially oriented at the stator 16 are guided through these windows 56*m*.

For connecting the coil terminals 50*b*, the structural unit shown in FIG. 4 is arranged at the stator 16, as is shown schematically in FIG. 1, and fixed by means of the fastening portions 62 *a-e*. It can be seen from the perspective stator section shown in FIG. 6 that the carrier member 56 with the connection conductors 52*a, b, c* is accordingly located so as to be directly axially adjacent to the areas where the coil terminals 50*b* emerge from the coils 36 and overlap the latter radially.

Figure 6:
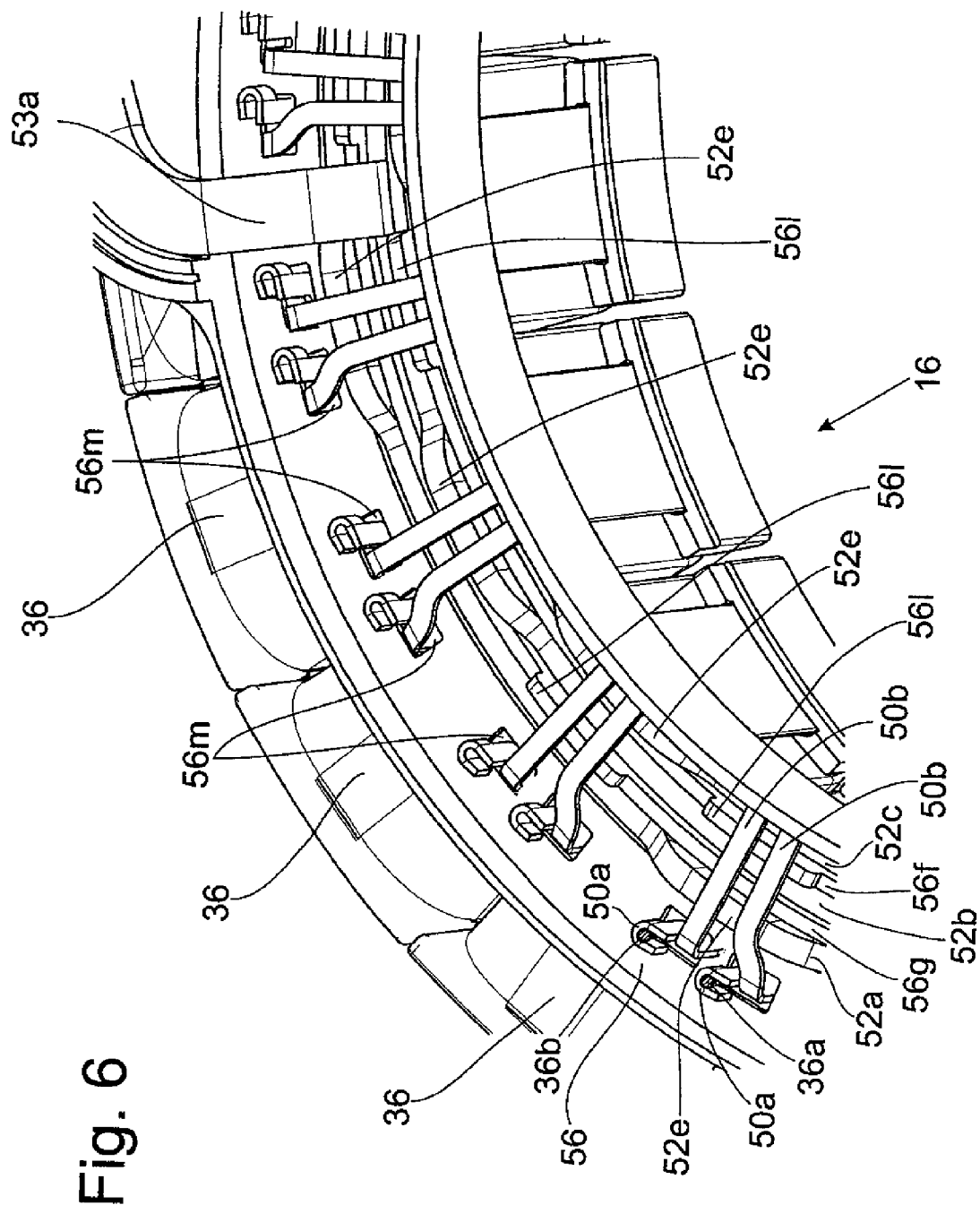
FIG. 6 shows a perspective sectional view of a stator outfitted with individual coils and having a connection arrangement.

In FIG. 6, the coil terminals or pins 50*b* are already guided through the windows 56*m* formed in the carrier member 56 and are bent radially inward by 90° inside the annular space or connection area 56*o* so that the coil terminals or pins 50*b* are initially at a distance from the connection conductors 52*a-c* and only come into contact with their raised terminal areas 52*e*. At the same time, the pins 50*b* contact the elevations 56*l* of the separating webs 56*f, g* and are supported at the latter. Every two connection terminals 50*b* of every two immediately adjacent coils 36 are electrically connected to one of the connection conductors 52*a-c*. The contact connection is preferably carried out by a material bond, e.g., by soldering or welding. The raised terminal areas 52*e* are longer in the circumferential direction of a connection conductor 52*a-c* than the extension of the coil terminals 50*b* in this direction, so that no problems arise from deviations in the positioning of the contact points caused by tolerances during parts manufacture and/or assembly. Further, it can be seen that the U-shaped terminal areas 50*a* with the winding ends 36*a, b* connected therein are also guided through the windows 56*m* and are accordingly likewise located in the connection area 56*o*.

To protect the connection conductors 52*a-c*, the coil terminals 50*b* and the contact areas of the winding ends 36*a, b*, and the terminal conductors 53*a-c* from corrosion and also to make the circuit arrangement more stable, the connection area 56*o* of the carrier member 56 is completely sealed with a sealant, for example, resin or silicone, after the connection is completed. The windows 56*m* and the contact elements 50 protruding at the coils, that is, the contact portions 50*b*, are also completely sealed from the environment.

In a modification of the connection arrangement that is not shown in the drawings, the pins 50*b* can also be constructed with slits, each of which can receive a terminal area which is bent away from a connection conductor 52*a-c* and can be connected to it by soldering, welding or the like.

The terminal areas of the connection conductors 52*a-c* can also undergo a crimping connection with the coil terminals in a known manner. For this purpose, the coil wire or a contact pin can preferably be inserted into an area formed by the base area and a terminal area projecting from the base area, whereupon the projecting terminal area is bent and a coil terminal is fixed to the connection conductor.

As an alternative to the embodiment example described above, the coil terminals can also be formed directly by the winding ends of the coils.

Instead of the radial staggering of the connection conductors shown in the drawings, these connection conductors can also be arranged in an axially staggered manner with respect to the stator, and the additional elements, insofar as they are required, are adapted in a corresponding manner.

Also, the specific type of construction of the electric machine is irrelevant as regards the basic construction of the stator connection arrangement; for example, the electric machine can also have an external rotor type construction.

The invention is not limited by the embodiments described above which are presented as examples only but can be modified in various ways within the scope of protection defined by the appended patent claims.

We claim:

1. A stator for an electric machine having a central axis, the stator comprising:
    a stator yoke arranged concentrically around the axis;
    a plurality of stator teeth arranged circumferentially around the stator yoke and extending radially from the stator yoke;
    a plurality of coils arranged around respective said stator teeth, each said coil having a pair of axially extending coil terminals;
    an electrically insulating carrier member arranged adjacent to the coils and configured to form an open annular space, the carrier member having a base area which radially overlaps the coils, the base area having apertures which receive respective coil terminals therethrough; and
    a plurality of annular connection conductors arranged concentrically in said carrier member and electrically insulated from each other, the connection conductors being connected to the coil terminals in a predetermined manner in the open annular space, wherein the coil terminals project axially through the apertures into the open annular space and are bent radially inside the connection area so that they intersect with respective annular connection conductors and are configured to be connected by terminal areas projecting from the respective annular connection conductors.

2. The stator of claim 1 further comprising a plurality of insulating bodies arranged at said teeth, wherein each said coil extends around at least one said insulating body and each said pair of coil terminals is fixed to one of said insulating bodies.

3. The stator of claim 2 wherein the carrier member is supported on the insulating bodies.

4. The stator of claim 1 wherein each said coil has a pair of coil ends, each said coil terminal being formed by a respective said coil end.

5. The stator of claim 2 wherein each said coil has a pair of coil ends, said coil terminals being formed by contact elements fixed to said insulating bodies and connected to respective said coil ends.

6. The stator of claim 5 wherein each said contact element has a contact portion crimped onto a respective said coil end.

7. The stator of claim 1 wherein contact portions of the coil terminals extend into the apertures.

8. The stator of claim 1 wherein the carrier member comprises a base bounded by a pair of circumferentially extending side walls, the annular connection conductors being arranged between the side walls.

9. The stator of claim 8 wherein the carrier member further comprises circumferentially extending webs between the side walls, the webs separating the connection conductors.

10. The stator of claim 9 wherein each said web has a plurality of elevations extending axially above the connection conductors.

11. The stator of claim 9 wherein at least one of said sidewalls extends axially above said webs.

12. The stator of claim 1 wherein the annular connection conductors each have a plurality of axially extending terminal areas for connecting to the coil terminals.

13. The stator of claim 12 wherein the terminal areas are formed by one of swaging and stamping.

14. The stator of claim 1 wherein the coil terminals are bent to extend radially over the connection conductors.

15. The stator of claim 1 further comprising a sealant applied to the carrier member to enclose the connection conductors and the coil terminals.

16. The stator of claim 1 further comprising terminal conductors connected to respective said connection conductors, said terminal conductors being provided for connecting the stator to a power supply.

17. The stator of claim 16 wherein the carrier member comprises an insertion portion in which the terminal conductors are arranged.

18. The stator of claim 1, wherein the coil terminals project axially through the apertures into the open annular space and are bent radially by 90°.

19. The stator of claim 1, wherein two connection terminals of two immediately adjacent coils are electrically connected to one of the plural annular connection conductors.

20. The stator of claim 1, wherein the terminals of the coils are arranged at a common radial distance with respect to the axis of the electric machine and with a radial distance to the connection conductors.

* * * * *